United States Patent
Gräter

(10) Patent No.: US 9,038,371 B2
(45) Date of Patent: May 26, 2015

(54) ARRANGEMENT AND METHOD FOR STORING A REDUCTION AGENT AND SUPPLYING IT TO AN EXHAUST GAS SYSTEM OF AN COMBUSTION ENGINE AND AN INTERNAL COMBUSTION ENGINE INCLUDING SUCH A SYSTEM

(75) Inventor: Nicolas Gräter, Friedrichshafen (DE)

(73) Assignee: MTU FRIEDRICHSHAFEN GMBH, Friedrichshafen (DE)

( * ) Notice: Subject to any disclaimer, the term of this patent is extended or adjusted under 35 U.S.C. 154(b) by 830 days.

(21) Appl. No.: 13/136,702

(22) Filed: Aug. 8, 2011

(65) Prior Publication Data
US 2012/0031073 A1 Feb. 9, 2012

(30) Foreign Application Priority Data

Aug. 9, 2010 (DE) .......................... 10 2010 039 102

(51) Int. Cl.
*F01N 3/00* (2006.01)
*F01N 3/10* (2006.01)
*F01N 3/20* (2006.01)

(52) U.S. Cl.
CPC .............. *F01N 3/208* (2013.01); *F01N 2610/14* (2013.01); *F01N 2610/1406* (2013.01); *F01N 2610/1473* (2013.01); *Y02T 10/24* (2013.01); *F01N 2610/1493* (2013.01)

(58) Field of Classification Search
CPC ..................... F01N 2610/14; F01N 2610/1406; F01N 2610/1473; F01N 2610/1493; F01N 3/208; Y02T 10/24

USPC ..................... 60/286, 295, 301, 303
See application file for complete search history.

(56) References Cited

U.S. PATENT DOCUMENTS 8,241,577 B2 * 8/2012 Georis et al. .................. 422/173
8,424,724 B2 * 4/2013 Op De Beeck et al. ..... 222/146.1

FOREIGN PATENT DOCUMENTS

| DE | 44 .32 577 | 3/1996 |
| DE | 44 32 577 | 3/1996 |
| DE | 11 2007 002 720 | 12/2009 |
| DE | 11 2008 002 520 | 8/2010 |
| WO | WO 2008/080691 | 7/2008 |

* cited by examiner

*Primary Examiner* — Thomas Denion
*Assistant Examiner* — Diem Tran
(74) *Attorney, Agent, or Firm* — Klaus J. Bach

(57) ABSTRACT

In a supply arrangement for supplying a solution containing a reducing agent, in particular urea, to an exhaust gas system of an internal combustion engine wherein a supply line extending from a storage tank to an injector which is connected to the exhaust gas system includes an operating tank and a dosing arrangement, a return line extends between the dosing arrangement and the storage tank and the dosing arrangement includes a directional valve for directing solution to the injector during a first operating mode in which the engine is operating and, in a second operating mode in which the engine is shut down, directing the solution back to the storage tank for emptying the operating tank.

11 Claims, 2 Drawing Sheets

ARRANGEMENT AND METHOD FOR STORING A REDUCTION AGENT AND SUPPLYING IT TO AN EXHAUST GAS SYSTEM OF AN COMBUSTION ENGINE AND AN INTERNAL COMBUSTION ENGINE INCLUDING SUCH A SYSTEM

BACKGROUND OF THE INVENTION

The invention resides in a supply arrangement for supplying an exhaust gas system with a solution including a reducing agent in particular uric acid. The invention is also concerned with an internal combustion engine including such an exhaust gas cleaning system and also with a power generator unit and further with a method for supplying a solution containing a reducing agent to an exhaust gas system of an internal combustion engine and to a control arrangement.

For complying with future emission laws for diesel engines, treatment of the exhaust gases is unavoidable. In one particular exhaust gas treatment a liquid reduction agent such as a solution containing uric acid is admixed to the exhaust gas. The liquid reduction agent selectively reduces nitrogen oxides (NO, $NO_2$). This may occur by catalytic or non-catalytic reaction. For performing the respective reaction ammonium ($NH_3$) is required ($N_2$) so that as product of the reaction water ($H_2O$) and nitrogen ($N_2$) is formed. In case of a selective catalytic reaction, catalysts on the basis of zeolytes or essentially on the basis of titanium dioxide, vanadium pentoxide and tungsten oxide may be used.

The ammonium necessary for the selective reaction is generally not used in pure form but for example in the form of a 32.5 percent aqueous urea solution whose composition is defined by DIN 700-70. Basically, the terminology of a liquid reaction agent in connection with the present application is to be understood broadly and comprises in particular all liquid compositions which can provide ammonia for a reaction for reducing nitrogen oxides. In the preferred case of an aqueous urea-containing solution ammonia and $CO_2$ is formed by a hydrolysis reaction. The ammonia generated in this manner can react in the exhaust gas with the nitrogen oxide at a certain temperature in a catalytic or non-catalytic reaction.

Mainly dependent on the method of a catalytic or non-catalytic reaction, the reduction agent is admixed to the exhaust gas in a suitable quantity. The quantity of the admixed reduction agent has been found to be critical to obtain an effective reduction of the nitrogen oxides depending on the load, the selected method, and particularly the selected catalyst, etc. To this end, the reduction agent supply arrangement includes a dosing device for controlling the quantity of the solution containing the reducing agent as needed to an injector for injecting the reducing agent into the exhaust gas system. The amount of for example aqueous urea solution needed for a selective catalytic reaction is, depending on the raw emission of an engine, about 2% to 8% of the Diesel fuel used. A reserve of the reduction agent is stored in a storage tank. A reduction agent quantity as needed for the injection is provided in an operating tank which is directly connected to the dosing device so as to form an intermediate store which is rapidly available when needed.

It is however problematic that a solution containing a reduction agent freezes at low temperatures. A solution containing urea freezes for example at $-11°$ C. and consequently needs to be protected when the Diesel engines are used at low temperatures. During larger shut-down periods of an internal combustion engine in a cold environment, freezing of the solution containing the reducing agent particularly in the operating tank cannot always be prevented so that, before engine startup, the components containing the reduction agent need to be heated. As described for example in WO 2008/080691, the operating tank is preferably provided with a heating device so that the reducing agent provided for an immediate dosing is protected from freezing and can be supplied via the dosing device to the injector immediately after the start of the internal combustion engine.

Problematic however are the provisions needed in an engine compartment for the heating, such as the installation space, since the heating device is subject to certain installation conditions with regard to installation location and installation level with respect to a cooling circuit of the internal combustion engine. In addition, the control of the heating device has generally been found to be comparatively expensive.

An improved concept which would effectively prevent the freezing of the reduction agent in the operating tank would consequently be desirable and it is therefore the object of the present invention to provide an arrangement and a method by which an exhaust gas system of an internal combustion engine can be supplied with a reduction agent containing solution wherein a freezing of the solution in the operating tank is essentially prevented. The arrangement and method to achieve this result should also be simple and inexpensive.

SUMMARY OF THE INVENTION

In a supply arrangement for supplying a solution containing a reducing agent, in particular urea, to an exhaust gas system of an internal combustion engine wherein a supply line extending from a storage tank to an injector which is connected to the exhaust gas system includes an operating tank and a dosing arrangement, a return line extends between the dosing arrangement and the storage tank and the dosing arrangement includes a directional valve for directing solution to the injector during a first operating mode in which the engine is operating and, in a second operating mode in which the engine is shut down, directing the solution back to the storage tank for emptying the operating tank.

The invention is based on the understanding that the danger of freezing of the reduction agent is greatest in the area of the operating tank particularly during an extended shutdown of the engine. The inventor has recognized that freezing of the reducing agent cannot safely be prevented if a reducing agent is present in the operating tank over extended engine shut-down periods. The inventor has recognized however, that this danger can be eliminated if practically no reducing agent is contained in the operating tank during such a shut-down period. Consequently, in accordance with the invention the supply arrangement is provided with a return line extending from the dosing device back to the storage tank bypassing the operating tank. In addition, the dosing device is in accordance with the invention so designed that it discharges the solution containing the reducing agent in a first and a second operating mode. Depending on the operating state of the internal combustion engine, the operating modes are different. The first operating mode of the dosing device is assigned specifically to an engine running operating mode. The second operating mode serves as preparation for an extended engine shut-down period of the internal combustion engine. In the first operating mode, the dosing device supplies the solution containing the reducing agent to the injector and/or the operating tank. In particular, the reduction agent is admixed via the injector to the exhaust gas of an exhaust gas line or, respectively, excess reducing agent is returned to the operating tank. In contrast to the state of the art, the dosing device is designed to transfer the solution containing the reduction agent to the return line. In other words, the concept of the invention of preparing for a shutdown of the engine provides for the possibility to empty out the operating tank via the dosing device and the return line so that no reducing agent can freeze in the operating tank during engine shutdown.

The concept of the invention also applies to an internal combustion engine with a reducing agent supply arrangement as described above wherein the supply arrangement is connected via the injector to an exhaust gas line of an exhaust system. In particular, in the case of a selective catalytic nitrogen oxide reduction, a catalytic converter is provided in the exhaust line and the supply arrangement is connected to the exhaust line via the injector upstream of the catalytic converter. The invention may also be used in connection with a power generator unit including an internal combustion engine, in particular a large diesel engine with a power output of between 2000 KW and 4000 KW.

The method according to the invention is concerned with supplying a solution including a reduction agent to the exhaust gas of an internal combustion engine which, in accordance with the invention, comprises two operating modes. Preferably, the method is performed using a reducing agent supply arrangement of the type described above. In accordance with the method, a solution containing a reducing agent, which is present in an operating tank, is supplied in the first operating mode via a supply line and a dosing device to an injector and/or part of it is returned to the operating tank. In accordance with the invention, in a second operating mode, the solution containing the reducing agent, which is present in the operating tank, is supplied via the dosing device and a return line to the storage tank for emptying the operating tank.

In this way, in a supply arrangement according to the invention, heating of the operating tank is not necessary since it is emptied during the second mode of operation. Basically, the concept according to the invention results in savings of components while utilizing synergistically existing components of a reducing agent supply arrangement. In accordance with the invention, the dosing device which is present anyway is used for the transfer of the reducing agent from the operating tank via the return line to the storage tank. In addition, the concept according to the invention has been shown to be particularly safe and energy-efficient. In a known reducing agent supply arrangement with a heating structure for example, a supply pump needs to run also after shut-down of an internal combustion engine—even though for a short time—in order to achieve a pressure compensation between the supply arrangement and the exhaust gas system. Continued operation of a supply pump after engine shut down however is basically unsafe and also diminishes comfort because of the noise generated thereby. The use of heating-based reducing agent supply arrangements for internal combustion engines in motor vehicles is therefore limited.

Furthermore, the concept of the invention has been found to be particularly advantageous also for use in other types of internal combustion engines, particularly in large Diesel engines. In particular in connection with large Diesel engines with outputs of 2000 KW to 4000 KW, it is very advantageous if the need for heating arrangements can be omitted. An operating tank for reducing agents in large Diesel engines has for example a volume in the area of 100 liter. Such a tank would require a heat input of at least 5 KW in order to liquefy a frozen operating tank before startup of an engine that requires at least a one-hour heating period which is eliminated with the concept according to the invention. With the present concept, also high electric voltage potentials, thick electric cables and excessive consumption of coolants are not needed-especially in connection with large Diesel engines which otherwise would be needed for the heating arrangement. The concept of the invention is altogether comparatively simple and highly efficient. There are no installation space limits. In particular, the arrangement of the operating tank for the reducing agent is variable. Since a freezing danger is safely eliminated the components of the supply arrangement do not need to be pressure resistant since no compensation space for accommodating volume expansions as a result of freezing will occur.

As particularly advantageous the concept according to the invention was found in its application in connection with large Diesel engines for power generation operation that is specifically with Diesel power generator units. The use of large Diesel engines including the inventive concept in power generator units is particularly advantageous since on one hand the comfort requirements of large Diesel engines in a power generator unit are of subservient importance and, on the other hand, the operation of the dosing arrangement after engine shutdown is generally not problematic.

In connection with a particularly advantageous embodiment of the invention, the dosing arrangement can be switched between two operating modes. Preferably, the dosing arrangement includes a directional valve to which the supply line and the return line are connected. The dosing arrangement advantageously also includes a dosing pump. Under the control of the directional valve, the solution containing the reducing agent can be directed via the directional valve in a first operating mode to the supply line and in a second operating mode to the return line. Advantageously, the dosing arrangement includes a dosing pump which is combined with the directional valve. The directional valve may also be realized by the dosing pump. It is particularly advantageous if the directional valve is arranged in the supply line between the operating tank and the dosing pump. This provides for a particularly advantageous flow pattern of the solution containing the reducing agent in the first and the second mode of operation in that, by means of the dosing pump, the solution containing the reducing agent is conducted in the first operating mode via the supply line to the injector and/or the operating tank and in the second operating mode via the return line to the storage tank.

Specifically, the directional valve of the dosing arrangement is a 5/2 way valve with two switch positions which are switched depending on the operating mode. The arrangement may also be obtained with a 3/2 valve if only two instead of four connections are made available for the supply line. It is advantageous if, by means of the directional valve, in a first switching position in the first mode of operation the supply line is switched for conducting fluid in both directions while the return line is blocked. In this way, it is made sure that, during operation of an internal combustion engine, the supply of reducing agent to the exhaust system is ensured or, respectively, excess reducing agent can be returned to the operating tank. The solution containing the reducing agent is supplied in the first mode of operation preferably from the storage tank to the operating tank. To this end, advantageously in addition to the dosing pump, a supply pump is provided.

With the directional valve in a second switching position, in the second mode of operation, the supply line is open unidirectionally toward an injector and is blocked toward the operating tank and furthermore the return line is open unidirectionally in the direction toward the storage tank. Preferably, no reducing agent containing solution is supplied from the operating tank to the injector in the second mode of operation. It is particularly advantageous if in the supply line between the storage tank and the operating tank a second blocking structure is provided which is effective in the second mode of operation. The blockage may be provided by a supply pump which is inoperative, that is, does not pump in the second mode of operation.

In this way, the method according to the invention permits, in the second mode of operation, a transfer of the solution containing the reducing agent to the storage tank. Preferably, the arrangement permits a total emptying of the operating tank. This has the advantage that the supply arrangement in particular the operating tank does not need a heating device, that is a heating device can be omitted with the arrangement according to the invention.

Below, exemplary embodiments of the invention will be described with reference to the accompanying drawings. The drawings are not intended to show the exemplary embodiments to scale but they are rather schematic representations. With regard to teachings and supplemental features recognizable from the drawings, reference is made to the respective state of the art. It is noted that many modifications and changes with respect to the form and details of an embodiment may be made without departing from the concept according to the invention. The features of the invention provided in the description and the drawings and also in the claims may be essential alone or in an combination for further development of the invention. In addition, all combinations of at least two features disclosed in the description, the drawings and/or the claims are within the frame of the invention. The general concept is not limited to the exact form or detail of the preferred embodiments shown and described below or limited to a subject matter that would be limited in comparison with the subject matter as defined in the claims. Concerning dimensions provided herein, any values within given limits may be used and should be covered.

Further advantages, features and embodiments of the invention will become more readily apparent from the following description with reference to the accompanying drawings.

DESCRIPTION OF EXEMPLARY EMBODIMENTS

Figure 1A:
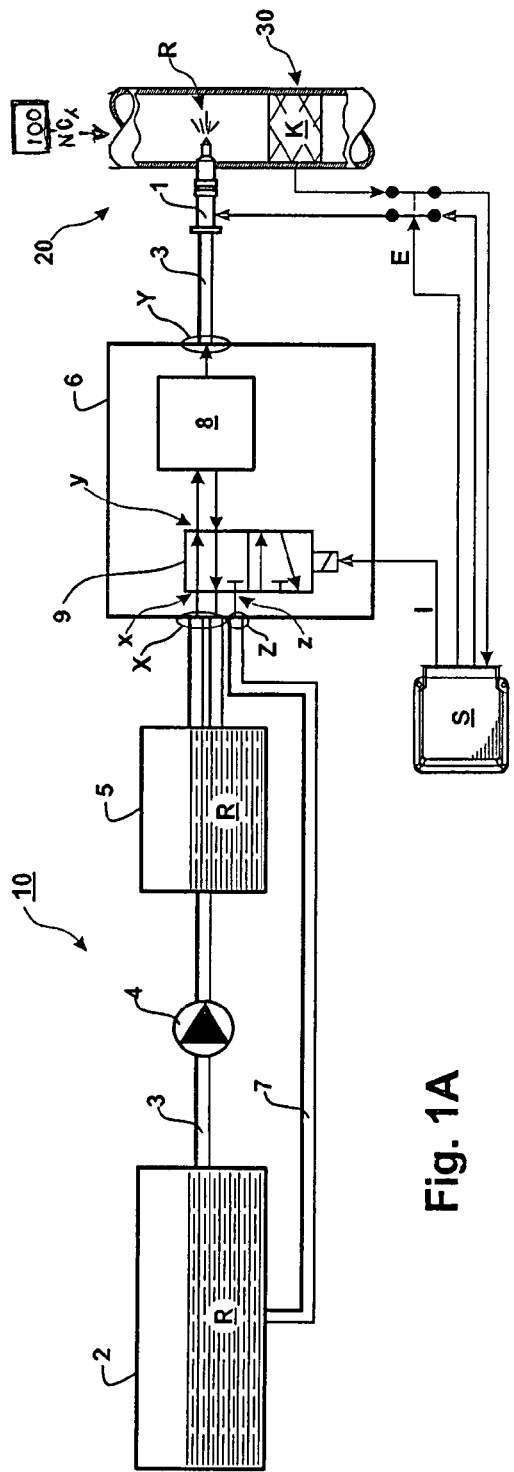
FIGS. 1A and 1B show a preferred embodiment of a supply arrangement and a dosing device with a return line and a dosing pump and a directional valve, wherein in view (A) the directional valve is shown in a first switching position for a first mode of operation and in view (B) the directional valve is down in a second switch position for a second mode of operation and, FIG. 2 shows a preferred embodiment of a method shown by means of a flow diagram wherein a first and a second mode of operation are disclosed controlled in a suitable manner.

FIG. 1A shows a supply arrangement 10 which is connected to an exhaust gas system 20 with an exhaust gas treatment device 30 and which is controlled by a control unit S. The supply arrangement 10, the exhaust gas system 20 and the exhaust gas treatment device 30 are part of an internal combustion engine 100 which is not shown in detail. The internal combustion engine 100 is a large Diesel engine of between 2000 KW and 4000 KW power output and is part of an electric power generator unit which is also not shown.

Figure 1B:
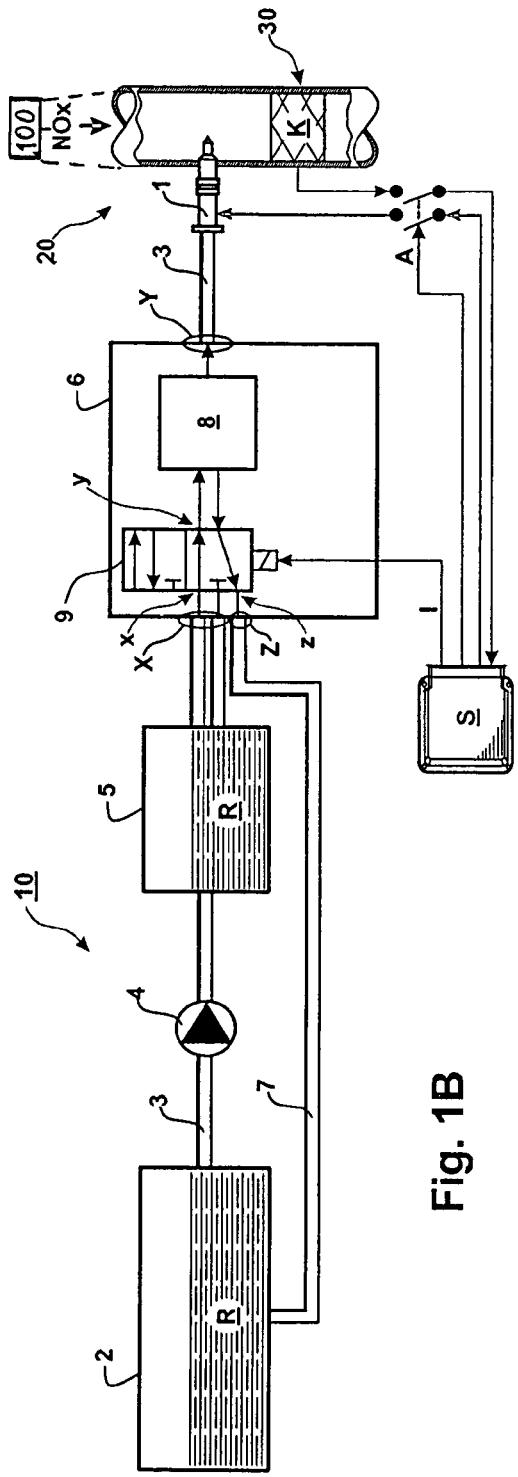
Figure 2:
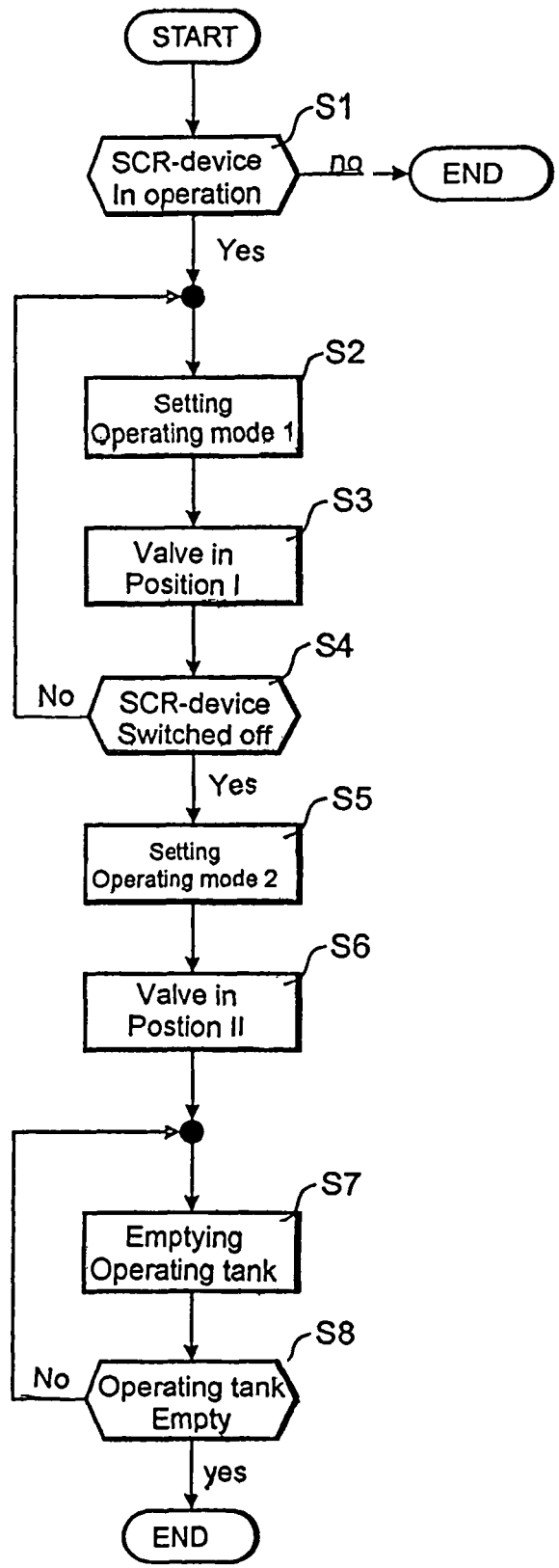

The supply arrangement 10 supplies the exhaust gas system 20 of the internal combustion engine 100 with a urea-containing solution which is used as a reducing agent for the reduction of nitrogen oxides $NO_x$ in connection with a selective catalytic reaction in the exhaust system. For performing the selective catalytic reaction nitrogen oxides $NO_x$ are reduced together with a reducing agent R in a selective catalytic converter K in the exhaust gas system 20 to form nitrogen and water. The urea-containing reducing agent R is injected into the exhaust gas system via an injector 1. The injector 1 as well as the catalytic converter K are controlled by the control unit S. As shown in FIG. 1A, FIG. 1B and FIG. 2, also the supply arrangement 10 is controlled. The solution containing the reducing agent R in the form of urea is stored in the supply arrangement in a storage tank 2. For supplying urea-containing solution to the injectors 1, the supply arrangement includes a supply line 3 which extends between the storage tank 2 and the injector 1 for conducting the urea-containing solution. In the supply line 3, a supply pump 4 is arranged as well as, somewhat further downstream, an operating tank 5 for the intermediate storing of the reduction agent R in the form of a urea-containing solution. The reducing agent can flow through the operating tank 5 that is in downstream direction from the supply pump 4 to a dosing arrangement 6. The dosing arrangement 6 is connected in the supply line 3 immediately upstream of the injector 1. A return line 7 extends between the dosing arrangement 6 and the storage tank 2 for the urea-containing solution. The dosing arrangement includes altogether three connections X, Y, Z.

As indicated by the arrows at the supply line 3 and the return line 7, the supply line 7, the solution containing the urea can flow through the supply line 3 between the operating tank 5 and the dosing arrangement 6 in both directions. This measure permits to return urea-containing solution which is not discharged via the injector 1 from the dosing arrangement 6 back to the operating tank 5. Otherwise, the supply line 3 is unidirectional toward the injector 1 that is in downstream direction. The return line is unidirectional in the opposite direction that is in upstream direction from the dosing arrangement 6 toward the storage tank 2.

With an internal combustion engine 100 in the form of a large Diesel engine with a power output of between 2000 and 4000 KW as it is presented here, the operating tank 5 has a volume of about 100 liters. With such a large tank, the possibility of freezing of the reducing agent R in the operating tank 5 must be safely avoided. On the other hand with such a supply arrangement 10 a heating arrangement as generally used for such a tank 5 is expensive and often inappropriate.

In accordance with the concept of the present invention in the embodiment described herein the operating tank 5 can be emptied in a second operating mode with a shutdown of the engine 100 via the dosing arrangement 6 into a return line 7. The reducing agent R discharged into the return line 7 via the dosing arrangement is then contained during engine shutdown in the storage container 7 where there is no immediate danger of freezing or respectively this can be prevented comparatively easily.

In addition to the return line 7, the supply arrangement 10 includes for the realization of the concept according to the invention a dosing arrangement 6 of a special design: The dosing arrangement 6 is provided with a dosing pump 8 and 5/2-way directional valve 9. The directional valve 9 is arranged in the dosing arrangement between the operating tank 5 and the dosing pump 8 and has five connections $2x$, $2y$, $1z$ as well as two switching positions. The connections x, y, z of the directional valve 9 are connected to the connections x, y, z of the dosing arrangement 6. The connection x and y are in the shown embodiment coupled, that is, there are two connections for each of the flow directions of the supply line 3. In principle, also a simplified solution may be provided which is not shown here but which uses a 3/2-way valve to which the supply line 3 is connected via simple bidirectional connections x, y. It is also to be understood that, for performing the functions described, another valve or an arrangement of other directional valves may be used.

By means of the dosing pump 8, the solution containing reducing agent R can be pumped in a first operating mode via the supply line 3 to the injector 1. The solution containing the reducing agent R may also flow back to the operating tank 5 in this first operating mode. If no further reducing agent R is needed in the exhaust gas system 20 for the nitrogen oxide reduction. In this first operating mode, the directional valve 9 is in a first switching state in which the supply line 3 is open in both directions so that the reducing agent solution can flow in either direction whereas the return line 7 is blocked.

This switching state of the directional valve 9 is controlled by the control unit S which reacts to an on-switching state E of the exhaust gas treatment device 30. The exhaust gas treatment device 30 provides to the control unit S the switch-on state E and additionally also parameters of the injector 1 and of the catalytic converter K. In this way, further settings of the dosing arrangement 6, which are not explained here, can be controlled in order to achieve the most effective nitrogen oxide reduction possible.

The directional valve 9 is shown as a 5/2 way magnetic valve whose anchor can be actuated by a coil the energization of which with a control current is controlled by the control unit S. In the first operating mode of the supply arrangement 10 shown in FIG. 1A, the directional valve 9 is de-energized and open so that the supply line is also open in both directions.

In the second operating mode of the supply arrangement 10 as shown in FIG. 1B, the directional valve 9 is energized by a control current 1 and is therefore in a second switching state. The control current energizes herein the coil of the directional valve 3 whereby, by cooperation of a spring force and induction force, the anchor is moved to a second position providing for the second switching position of the directional valve 9.

The second operating position is set by the control unit S which reacts to a switch-off state A of the exhaust gas treatment device 30. The switch-off state A of the exhaust gas treatment device is, in time, ahead of a shutdown of the internal combustion engine 100 that is it is in preparation for the shutdown of the internal combustion engine 100. The switch-off state A of the exhaust gas treatment device 30 may also be established in the shut-down period of an internal combustion engine. In both variants, a supply performance of the dosing arrangement 6 is ensured for the second operating mode of the supply arrangement 10 until the operating tank 5 is completely empty. To this end, the directional valve 9 is energized and the dosing pump 8 is kept running. As shown in the representation of the dosing arrangement 6 of FIG. 1B, in the second operating mode, the supply line 3 between the operating tank 6 and the dosing pump 8 is switched open in the direction toward the injector by means of the directional valve 9 but is blocked in the direction toward the operating tank. Instead, the return line 7 is opened unidirectionally by the valve 9 in the direction toward the storage tank 2. As a result, the dosing pump 8 is in a position to pump the solution from the operating tank 5 via the supply line 3 and the directional valve 9 to the return line 7 and into the storage tank 2.

As soon as the operating tank 5 is reported empty, the control unit S lowers the control current I so that the directional valve 9 is again in the de-energized state in which it is open as shown in FIG. 1A. The supply arrangement 10 is then at the end of the shutdown period of the engine 100 ready for a new operating start. Freezing of the reducing agent R in the area of the operating tank 5 and the dosing arrangement 6 is safely prevented since, in preparation of the engine shutdown, that with an initiation of a switch-off state A of the exhaust gas treatment device 30, the operating tank 5 and the dosing arrangement 6 are pumped empty so that no reducing agent R is present in the operating tank 6.

FIG. 2 shows the flow diagram for a preferred execution of the method for performing the control procedure using a control unit for controlling the exhaust gas treatment device 30 in the exhaust gas system 20. To this end, the control arrangement S includes a suitable software module which is adapted to react to the switch-off state A or respectively the switch-on state E of the exhaust gas treatment device 30 and to provide for the first or, respectively, the second operating mode for the supply arrangement 10 by switching the directional valve 9 to the first or respectively the second switching state (FIG. 1A, FIG. 1B).

FIG. 2 shows that, after a start of the internal combustion engine 100 in a first method step S1 it is examined whether the exhaust gas treatment device 30 is operative. The exhaust gas treatment device 30 is disclosed in FIG. 2 as device for the selective catalytic reduction (SCR). If the exhaust gas treatment device is not operative, the control procedure ends. If the exhaust gas treatment device is found operative, that is, there is a switch-on state E according to FIG. 1, the control unit S establishes in a second operating step S2 a first operating mode for the supply arrangement 10. To this end, the directional valve 9 is, as shown in FIG. 1, de-energized and is open in the state I which is indicated in FIG. 2 by the method step S3. As long as, in a method step S4, it is not determined that the exhaust gas treatment device is in a switch-off state A, the directional valve 9 remains in its de-energized open position that is the method steps S2, S3, S4 are repeated sequentially.

If a switch-off state A of the exhaust gas treatment device 30 is indicated as shown in connection with FIG. 1B—the second operating mode is established by the control unit S by performing the method steps S5, S6 and the directional valve 9 is brought by a control current I into the second switching position. In the meantime the dosing pump 8 continues to pump while a delivery of reducing agent R from the dosing arrangement 6 to the supply line 3 to the injector 1 is prevented.

In this way, the operating tank 5 is pumped out as indicated by the method step 7 until in the step 8, it can be determined that the operating tank 5 is completely empty.

As long as it cannot be confirmed that the operating tank 5 is empty, the second switching position of the directional valve remains unchanged and the operation of the dosing pump 8 according to the representation of the dosing arrangement 6 of FIG. 1B is continued. Only when, following the control step S8, it is confirmed that the operating tank 5 is empty the control procedure is terminated.

With the termination of the procedure also the control current I applied by the control unit S to the directional valve 9 is lowered so that this valve returns to the first switching position as shown in FIG. 1A that is it is de-energized and returns to an open position.

| Listing of Reference Numerals | |
|---|---|
| 1 | Injector |
| 2 | Storage tank |
| 3 | Supply line |
| 4 | Supply pump |
| 5 | Operating tank |
| 6 | Dosing arrangement |
| 7 | Return line |
| 8 | Dosing pump |
| 9 | Directional valve |
| 10 | Supply arrangement |

-continued

| Listing of Reference Numerals | |
|---|---|
| 20 | Exhaust gas system |
| 30 | Exhaust gas treatment device |
| 100 | Internal combustion engine |
| A | Switch-off state |
| E | Switch-on state |
| I | Control current |
| K | Catalytic converter |
| $NO_x$ | Nitrogen oxides |
| R | Reducing agent |
| S | Control unit |
| SCR | Selective catalytic reduction |
| S1-S8 | Operating steps |
| X, Y, Z | Dosing arrangement connection |
| x, y, z | Valve connections |

What is claimed is:

1. A supply arrangement (10) for supplying a solution containing a reducing agent (R) to an exhaust gas system (20) of an internal combustion engine, comprising:
a storage tank (2) having a supply line (3) connected to the storage tank (2) and including a dosing arrangement (6) with a dosing pump (8) for controlling the supply of the solution to the exhaust gas system (20),
an operating tank (5) arranged in the supply line (3) between the storage tank (2) and the dosing arrangement (6) for an interim storage of the solution,
an injector (1) connected to the supply line (3) downstream of the dosing arrangement (6) for injecting the solution into the exhaust gas system (20), and
a return line (7) extending between the dosing arrangement (6) and the storage tank (2) bypassing the operating tank (5), the dosing arrangement (6) further including a directional switching valve (9) operable in a first operating mode wherein, in a first position of the directional switching valve (9), the solution is supplied to the injector (1) and excess solution is returned to the operating tank (5) and the directional switching valve (9) is operable in a second operating mode wherein, in a second position of the directional switching valve (9), the solution is directed to the return line (7) for returning all of the solution from the operating tank (5) to the storage tank (2) to empty the operating tank (5) in order to keep the operating tank (5) empty to prevent its freezing during shutdown of the engine.

2. The supply arrangement according to claim 1, wherein the directional switching valve (9) is arranged in the supply line (3) between the operating tank (5) and the dosing pump (8).

3. The supply arrangement according to claim 1, wherein the directional switching valve (9) is switchable so as to provide in the first operating mode for bidirectional passage of solution through the valve (9) and blockage of the return line (7).

4. The supply arrangement according to claim 1, wherein, between the storage tank (2) and the operating tank (5), a blocking device (4) is arranged in the supply line (3) which, in the second mode of operation, is shut down and for blocking solution flow between the operating tank (5) and the storage tank (2).

5. The supply arrangement according to claim 1, wherein the directional, switching valve (9) is switchable to a position wherein, in the second operating mode, the supply line is open unidirectionally in a direction toward the dosing pump (8) and is blocking in the direction toward the operating tank (5) and wherein the return line (7) is open for conducting solution back to storage tank (2).

6. The supply arrangement according to claim 5, wherein the directional switching valve (9) is switchable between the first and the second operating mode for supplying in the first operating mode the solution via the supply line (3) to the injector (1) and return excess solution to the operating tank (5) and in the second operating mode direct the solution to the return line (7).

7. An internal combustion engine (100) having a supply arrangement (10) for supplying a solution containing a reducing agent (R) to an exhaust gas system (20) of an internal combustion engine, the supply arrangement comprising:
a storage tank (2) with a supply line (3) connected to the storage tank (2) and including a dosing arrangement (6) with a dosing pump (8) for controlling the supply of the solution to the exhaust gas system (20),
an operating tank (5) arranged in the supply line (3) between the storage tank (2) and the dosing arrangement (6) for an interim storage of the solution,
an injector (1) connected to the supply line (3) downstream of the dosing arrangement (6) for injecting the solution into the exhaust gas system (20), and
a return line (7) extending between the dosing arrangement (6) and the storage tank (2) bypassing the operating tank (5), the dosing arrangement (6) including a directional switching valve (9) operable for the delivery of the solution containing the reducing agent (R) in a first operating mode in which the solution is supplied to the injector (1), and excess solution is returned to the operating tank (5) and the directional switching valve being operable to direct in a second operating mode in which, upon shutdown of the internal combustion engine, the directional switching valve (9) is switched so as to direct the solution to the return line (7) for returning all of the solution from the operating tank (5) to the storage tank (2) to empty the operating tank (5) during engine shutdown, the exhaust gas system (20) including a catalytic converter (K) for a selective catalytic $NO_x$ reduction and the supply arrangement (10) being connected to the exhaust gas system (20) upstream of the catalytic converter.

8. An internal combustion engine according to claim 7, including a control unit (S) for controlling operation of an exhaust gas treatment device (30) in the exhaust system (20) and also for controlling the operation of the supply arrangement (10), wherein, in a switch-on state (E) of the exhaust gas treatment device (30), the supply system (10) is operated in the first operating mode and in a switch-off state (A) of the exhaust gas treatment device (30) the supply arrangement (10) is operated in the second operating mode.

9. A method of supplying a solution containing a reducing agent (R) to an exhaust system (20) of an internal combustion engine (100) comprising the steps of supplying, in a first operating mode, the solution from a storage tank (2) via an operating tank (5) and a dosing arrangement (6) to an injector (1) for injection of the solution into the exhaust system, and, in a second operating mode, supplying the solution from the operating tank (5) via the dosing arrangement (6) back to the storage tank (2) so as to empty the operating tank (5) and the dosing arrangement (6) in preparation for a shutdown of the engine while any flow of solution between the storage tank (2) and the operating tank (5) is blocked and a supply pump (4) arranged in a supply line (3) between the storage tank and the operating tank (5) is shut down.

10. The method according to claim 9, wherein, in the second operating mode, any flow of the solution from the operating tank (5) to the injector (1) is blocked.

11. The method according to claim 9, wherein, in the first operating mode, solution is supplied from the storage tank (2) to the operating tank (5).

\* \* \* \* \*